United States Patent [19]

Kister

[11] 4,241,444
[45] Dec. 23, 1980

[54] ARRANGEMENT FOR TIME-DIVISION MULTIPLEX PWM DATA TRANSMISSION

[75] Inventor: Horst Kister, Wehrheim, Fed. Rep. of Germany

[73] Assignee: VDO Adolf Schindling AG, Frankfurt am Main, Fed. Rep. of Germany

[21] Appl. No.: 960,443

[22] Filed: Nov. 13, 1978

[30] Foreign Application Priority Data

Nov. 14, 1977 [DE] Fed. Rep. of Germany ....... 2750818

[51] Int. Cl.³ .............................................. H04J 3/06
[52] U.S. Cl. ......................................... 370/85; 370/9; 370/100
[58] Field of Search ....... 179/15 AL, 15 AW, 15 BS; 370/9, 85, 100

[56] References Cited

U.S. PATENT DOCUMENTS

| | | | |
|---|---|---|---|
| 3,622,693 | 11/1971 | Del Ciello | 179/15 AW |
| 3,644,677 | 2/1972 | Cecchin | 179/15 AW |
| 3,720,790 | 3/1973 | Watson | 179/15 AL |
| 3,870,825 | 3/1975 | Roberts | 179/15 AL |
| 3,959,594 | 5/1976 | Srivastava | 179/15 AL |
| 4,052,566 | 10/1977 | MacKay | 179/15 AL |
| 4,052,567 | 10/1977 | MacKay | 179/15 AL |

Primary Examiner—David L. Stewart
Attorney, Agent, or Firm—Martin A. Farber

[57] ABSTRACT

An arrangement for time-division multiplex data transmission having a data bus system which comprises a data bus circuit, several subscribers which are connected to the data bus circuit and have a transmitter part and a receiver part and communicate with one another by data transmission in a predetermined sequence in a given combination, and at least one clock generator, in which the sequence of all the given combinations of the subscribers runs through during a time frame and a time slot within the time frame is available for connecting each combination. Each subscriber includes at least one programmable counter for emitting a control signal when a programmed number has been reached and for resetting itself to zero when a given counting capacity which is the same for all counters has been reached. The programmable counter has a counter input connected to the clock generator and a first control output. A switching device is connected to the first control output for forming a data-transmitting connection between the data bus circuit and a data source or data sink respectively of each subscriber. Each subscriber has its clock generator. The programmable counter of each subscriber can be reset synchronously with the programmable counter of the other subscribers and can not be subjected at its counter input to clock pulses generated by the clock generator until the programmable counter of a slowest of the subscribers has been reset, which determines the end of the time frame, whereby the programmable counters of all the subscribers are synchronized with one another.

14 Claims, 13 Drawing Figures

Short-circuit case: A and B in short-circuit; C receives

FIG.11

ARRANGEMENT FOR TIME-DIVISION MULTIPLEX PWM DATA TRANSMISSION

The invention relates to an arrangement for time-division multiplex data transmission, having a data bus system which comprises a data bus circuit, several subscribers which are connected to the data bus circuit and have a transmitter part and a receiver part and communicate with one another by data transmission in a predetermined sequence in given combination, and at least one clock generator.

For data transmission, data transmission units are known which differ in principle in their construction; in a known line system, two or more data stations are in each case solidly connected to one another via a line. Data transmission can here take place at any time between the given data stations. With a large number of data stations or subscribers, however, this line system requires a very high expense on cabling.

This expense can be reduced by a central system in which all the data stations can be connected to one another via lines leading in star formation to a central office. This central system has the disadvantage, however, that interventions are necessary in the central office when additional subscribers which had not been foreseen originally are connected and that, in the case of a fault in the central office, there is the danger that the data transmission between a large number, if not all, of the subscribers no longer proceeds in an orderly manner.

The state of the art also includes a serial data bus system of the generic type mentioned at the outset, wherein data are transmitted on a data bus circuit in a predetermined sequence between given subscribers in each case. While a subscriber or a predetermined group of subscribers is connected to the data bus circuit, other subscribers must not pass any data to this data bus circuit. Even though all the subscribers connected to the data bus circuit are always ready to receive, only one subscriber or a defined group of subscribers may record the particular data being transmitted for further processing. For this purpose, the transmitter part of a subscriber, which at the time is intended to transmit data, emits, before transmitting the information, an address signal which permits only the desired other subscriber or the desired other group of subscribers to transmit the information for further processing at this subscriber. The end of this transmission is indicated by an end signal of the data bus circuit, which signal causes the next subscriber or the next group of subscribers to emit their information with a preceding address signal and a succeeding end signal. If each subscriber is equipped to emit an end signal after his information has been passed to the data bus circuit, a variable period of time can be permitted for each subscriber to transmit information. Otherwise, fixed periods of time for the serial transmission of data are used, as a result of which the construction of the arrangement for data transmission can be simplified. Known arrangements of this type for serial or time-division multiplex data transmission can be designed for the transmission of analogue signals and/or so-called discrete signals which merely contain yes/no information. A field of application of a data bus system for transmitting discrete signals is remote power control in aircraft.

Although known data bus systems are in principle suitable for transmitting discrete signals, these known data bus systems have a disadvantage, in particular when transmitting discrete signals, since the expense of transmitting and processing the address signals, which are useless for the transmission of the actual information, is relatively high. If there is a large number of subscribers, the address signal must comprise several bits, for example 8 bits, while 1 to 2 bits are sufficient for transmitting the discrete signals.

It is therefore the object of the present invention to improve the relative period of time during which the data bus system is available for transmitting the actual useful information, while retaining and, if possible, enhancing the principal advantages of a data bus system. This relative period of time is based on the total time which is composed of the duration of the transmission of useful information and the particular preceding and, if appropriate, succeeding period of time for controlling the subscribers. With a given transmission speed of the data bus system, the transfer output is thus to be increased. The means for the control of the subscribers should here be as simple as possible. The abovementioned advantages of the data bus systems, which should be retained and, if possible, even enhanced when achieving the object according to the invention, include a good degradation behaviour, which means that, when there is a failure at one subscriber, no other subscribers should be affected, a high flexibility of the system, which means that subscribers can be added or exchanged without a need for changes in wiring, a high reliability and absence of faults and also a facility for simple and reliable testing. Components which are as small, light and cheap as possible should suffice for releasing this system in terms of hardware.

For an arrangement for time-division multiplex data transmission, having a data bus system of the generic type mentioned at the outset, this object is achieved when each subscriber has at least one programmable counter which emits a control signal when a programmed number has been reached and which resets itself to zero when a given counting capacity which is the same for all the counters has been reached, when a counter input of the counter is connected to the clock generator, when a first control output of the counter is connected to switching means for building up the data-transmitting connection between the data bus circuit and a data source or data sink of this subscriber and when the counters of all the subscribers are synchronised with one another.

This arrangement works according to the principle that the address of each subscriber is given beforehand by programming a number into the programmable counter and that this counter builds up the data-transmitting connection between the data source or data sink of this subscriber and the data bus system when the counter which is fed with clock pulses by the clock generator reaches the programmed number. All the counters of the subscribers in this arrangement are triggered conjointly by clock pulses and thus count at the same level. Inbetween two clock pulses, the transmission of information takes place in each case between the transmitting subscriber or a group of transmitting subscribers on the one hand and a receiving subscriber or group of receiving subscribers on the other hand, the counter of which has reached the programmed number by counting the clock pulses. At those subscribers where the actual counted value corresponds to the programmed number, the transmitting stage or the receiving stage is thus released, while no release takes place in all the other units. Inbetween two clock pulses, a data transmission without interference by the remaining subscribers can now take place between the released transmitting subscriber and the released receiving subscriber or the transmitting group or receiving group of subscribers. As soon as the next clock pulse occurs, the existing connection between the subscribers is switched off and a new constellation of subscribers can now be connected with one another for data transmission. After a given fixed counting capacity has been reached, which as a rule corresponds to the total counting capacity of each individual counter, the counters reset themselves to zero. The period of time between two resettings of the counters to zero is called the time frame. Within this time frame, all the given combinations of subscribers which are connected to one another for data transmission are built up in a given sequence. A period of time between two clock pulses, which is called a time slot, is available for data transmission in a combination. Thus, the time frame is here divided into time slots of equal size for the time-division multiplex data transmission.

This arrangement is thus distinguished in that it is not necessary to emit, to receive and to process an address signal which consists of a multi-digit binary number, before a data-transmitting connection is built up in a combination of subscribers; rather, a single clock pulse suffices before the data-transmitting connection is built up between each new, given combination of subscribers. Apart from the transmission of these short clock pulses or synchronisation pulses which are yet to be discussed, the data bus circuit is available for transmitting the useful information.

Coupled with extensive decentralisation, this system can work with a single clock generator for all the subscribers, which clock generator transmits its clock pulses via the data bus circuit. In a particularly advantageous manner, however, it is also possible to realise a completely decentralised structure in accordance with this principle, by providing each subscriber with its own clock generator which ensures a synchronisation of the clock pulses as they come into action.

The arrangement according to the invention can be extended as desired from a minimum of two subscribers up to a maximum number of subscribers, which is limited by the counting capacity. The arrangement also gives a good degradation behaviour since the failure of a subscriber remains restricted to the latter. The costs, the weight and the volume of the means for building up each subscriber can be kept low and it is possible to incorporate these means directly into the components which control or which are to be controlled, such as, for example, switches, lamps, valves and contactors. These means can be realised by a single semi-conductor chip. A multiple of the arrangement according to the invention can be provided corresponding to the particular reliability requirements, and arrangements running parallel can be operated asynchronous. The degradation of the arrangement can be monitored and faults can be located by means of a monitoring device which is connected to the data bus circuit like any other subscriber, checks the desired state of the latter and locates faults. By providing a multiple of the arrangement, the degree of redundancy can be adjusted according to the reliability requirements.

An advantageous embodiment of the arrangement for time-division multiplex data transmission, in which the sequence of all the given combinations of the subscribers runs through during a time frame and a time slot within the time frame is available for connecting each combination, has the characteristics that each subscriber has a clock generator and that the counter of each subscriber can be reset synchronous with the counter of the other subscribers and cannot be subjected at its counter input to clock pulses generated by the clock generator until the counter of the slowest subscriber has been reset, which determines the end of the time frame.

In place of one counter provided for each subscriber, each subscriber can have a counter for the transmitting address and a counter for the receiving address, as described further below.

In the preceding embodiment of the arrangement, in which its own clock generator is provided for each subscriber, a completely decentralised structure can be realised by the measures taken, but the arrangement can here nevertheless run in exact tuning in time since the end of the time frame is synchronised each time even if some counting procedures are faulty. The start of the next transmission cycle is thus necessarily fixed.

In detail, this synchronisation can advantageously be effected in an arrangement for time-division multiplex data transmission in such a way that switching means, which are connected to the data bus circuit via a transmitter output stage, are connected at each subscriber to a second control output of the counter in order to generate a time-frame synchronisation pulse on resetting to zero, and that the data bus circuit is connected to a resetting input of the counter via a detector for time-frame synchronisation pulses and to clock-transfer means which are located between the clock generator and the counter input of the counter.

In this arrangement, resetting of the counter—or of the transmitting-address counter and the receiving-address counter—of all the subscribers procedes until the slowest subscriber has finished with the emission of the time-frame synchronisation pulse. During the emission of this time-frame synchronisation pulse, the connection between the counter input of the counters at all the subscribers and the clock generator is also interrupted so that these counters do not already count up before the next transmission cycle has started.

In another advantageous embodiment of the arrangement for time-division multiplex data transmission, the clock generator of each subscriber can in each case be synchronised with the clock generator of the other subscribers in such a way that the slowest subscriber determines the end of each time slot. This makes it possible to manage without accurate and hence expensive clock generators, for example quartz clock generators, in each receiver.

In detail, the abovementioned arrangement for time-division multiplex data transmission is advantageously provided with the characteristics that switching means, which are connected to the data bus circuit via the transmitter output stage, are connected at each subscriber to the second control input of the counter in order to emit a time-slot synchronisation pulse and that the data bus circuit is connected via a detector for the time-slot synchronisation pulse in such a way that the slowest subscriber determines the end of the time slot.

Thus, a time-slot synchronisation pulse is emitted by all the subscribers in each time slot. The time-slot synchronisation pulses are overheard by all the subscribers since all of them are always ready to receive. Corresponding to the last time-slot synchronisation pulse, the arrangement is synchronised anew for the next time slot.

In a principal embodiment of the arrangement for time-division multiplex data transmission, the means for addressing each subscriber are designed in such a way that the transmitter part of each subscriber has, as the counter, a transmitting-address counter with one counter input and the receiver part of each subscriber has a receiving-address counter with one counter input, that the counter inputs of the two counters are connected to the clock generator and that the two counters can be programmed independently of each other.

This design ensures the largest possible flexibility which makes it possible to realise the differing combinations of subscribers which are to be connected for data transmission. This is effected by programming the transmitting-address counter for that number at which, when it has been reached by the counting procedure, the transmitter part is connected to the receiver part of that subscriber or those subscribers, where the transmitted data are passed on to the data sink in which the same number had been programmed into the receiving-address counter. The transmitting-address counter and the receiving-address counter can here be programmed independently of each other.

The preceding embodiment presupposes, however, that the pins of the receiving-address counter and of the transmitting-address counter of each subscriber are brought out in order to be able to program these counters independently of each other. To reduce this expense, it is provided in a further development of the arrangement for time-division multiplex data transmission that, for allocating a transmitting address and an immediately adjacent receiving address, means are provided only for programming the counter for one number and that the subscriber also comprises switching means for allocating the transmitting address to even numbers and the receiving address to odd numbers or vice versa.—The transmitting address and receiving address, respectively, are here understood as those numbers at which, when they have been reached by the counter counting up, the transmitter part or the receiver part of the subscriber is switched through.

In the present variant, it is possible to reduce the number of connections provided for programming to almost half. If, for example, 8 pins which must be accessible externally are required for programming one of 256 receiving addresses and the same number of pins is required for programming 256 transmitting addresses, the total number of the pins to be provided for the transmitting-address counter and the receiving-address counter is 16. The necessary number of pins can be reduced to 9 by a fixed allocation of the transmitting address and receiving address in such a way that both are adjacent. There is now no more than one counter which can be programmed externally as desired, while the allocation of the transmitting address to even numbers and the allocation of the receiving address to odd numbers of vice versa is effected by an additional bit which can be programmed externally.

In a further advantageous embodiment of the arrangement for time-division multiplex data transmission, having several subscribers which are connected to a data bus circuit and the transmitter part of which has a transmitter output stage, the transmitter output stage is designed as an open collector circuit and the data bus circuit joined to the transmitter output stages passes through at least one resistor which is connected to a voltage source so that all the transmitter output stages form an OR-gate.

This embodiment of the transmitter output stage of the subscribers permits them to be integrated in a semiconductor chip, that is to say a MOS component, and makes it possible to synchronise the subscribers in a simple manner and to carry out logical OR-operations.

This embodiment is particularly advantageous in conjunction with the embodiment which generates the time-slot synchronisation pulses. In this case, all the subscribers simultaneously emit a time-slot synchronisation pulse, that is to say all the transistors of the open collector circuit in the transmitter output stages are switched through. The subscriber which switches off last here determines the point in time at which the signal level on the data bus circuit, to which the open collector circuits are connected, assumes again the state of a high signal (H signal) and releases the counters. The same applies to the time-frame synchronisation pulse at the end of each time frame, the next pass or the next transmission cycle taking place after the last time-frame synchronisation pulse has ended. The open collector circuit also makes it possible to realise OR-operations in a simple manner without additional measures, for example in order to run two of three subscribers simultaneously as transmitters and to run the third subscriber as a receiver which is switched through and which receives in the same time slot in which the transmitters emit data.

In a further development of the preceding arrangement for time-division multiplex data transmission, the transmitter output stages of the subscribers are each connected via one resistor to the data bus circuit.

This ensures in an advantageous manner that, even in the case of a short circuit in one or more transmitter output stages, sufficient signal amplitude which can be evaluated by the subscribers acting as receivers, is generated in the data bus circuit.

To increase the reliability in operation, it is also advantageous when a two-core screened line is used as the data bus circuit and, when one core of the line is directly connected to a voltage source and connected via several resistors in parallel to the second core to which the transmitter output stages are connected.

In a further advantageous embodiment, the arrangement for time-division multiplex data transmission has, with respect to the receiver part of each subscriber, the characteristics that a receiver circuit arrangement of each subscriber comprises an electronic comparator with a differential amplifier as well as a peak-responding rectifier, that a first input of the differential amplifier of the electronic comparator and one input of the peak-responding comparator are connected to the data bus circuit and that a second input of the differential amplifier of the electronic comparator is connected to the output of the peak-responding rectifier via a voltage divider.

This receiver circuit arrangement has the advantage that signals of differing level, on which direct voltages of different magnitude can be superimposed in the data bus circuit, can be reliably evaluated. For this purpose, the maximum signal voltage of the data bus circuit is determined with the aid of the peak-responding rectifier. A reference signal for the comparator is formed from this peak voltage by the voltage divider, and this reference signal is fed to one input of the differential amplifier. The signal voltage of the data bus circuit is directly fed to the second input of the differential amplifier. In this way, the relative level of the signal voltage can be evaluated. This receiver circuit arrangement works perfectly even in the case of short-circuits in several transmitter output stages.

According to a further concept of the invention, it is possible, using the arrangement according to the invention, to transmit not only digital data, but also analogue data, and specifically by transmitting pulses, the duration of which depends on an analogue value, in time slots. Since the determination of the pulse edge which changes its position as a function of the analogue value presents a few difficulties inasmuch as the pulse edge in general shows a distortion caused by the transmission on the line, it is advisable to transmit, at intervals from the pulse containing the analogue value, a reference pulse and to pass both these pulses to a stage which forms their ratio and which is upstream of the evaluation stage. In this manner, the errors produced by the distortion of the pulse edges can be eliminated from the evaluation. According to an embodiment of the invention, the reference pulse used can be a pulse, the duration of which is the value complementary to the duration of the pulse containing the analogue value. In another advantageous possibility, the reference pulse selected is a pulse, the duration of which is 100% of the maximum possible duration of the pulse transmitting the analogue value.

In the following text, the invention is explained in more detail by reference to the drawing in which.

Figure 1:
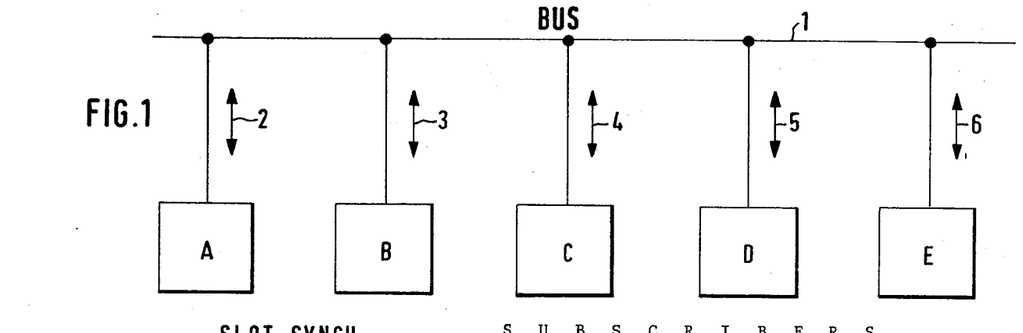
FIG. 1 shows in principle the structure of the arrangement for time-division multiplex data transmission of discrete signals.

In FIG. 1, a data bus circuit 1 having five subscribers A, B, C, D and E is shown diagrammatically. The subscribers are equipped for transmitting and receiving discrete signals, that is to say they actively transmit the information "ON" or "OFF". For this purpose, each subscriber consists of a receiver part, by means of which discrete information can be received and switched through to a receiving line, and of a transmitter part which is suitable for emitting discrete information in a digital form via a transmitting line. The transmitter part and receiver part will be explained in more detail below by reference to FIG. 3. In FIG. 1, the double arrows 2, 3, 4, 5 and 6 merely indicate that a data flow can take place from each subscriber to each subscriber. Which subscribers are thus connected, that is to say the particular combination of subscribers, and the sequence in which such connections are built up, results from the programming of each individual subscriber in a manner yet to be described.

Figure 2:
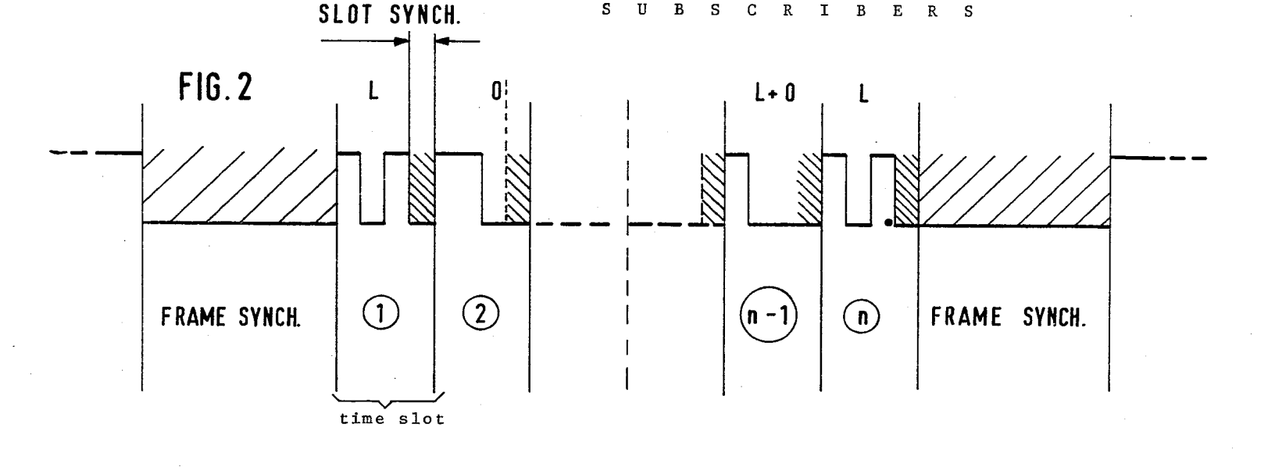
FIG. 2 shows a pulse diagram on the data bus circuit.

As explained further by reference to FIG. 2, all the subscribers connected to the data bus circuit generate a time-frame synchronisation pulse—frame synch.—followed by a series of 1–n time slots. Each time slot is provided for data transmission between at least two predetermined subscribers. Between two time-frame synchronisation pulses, all the subscribers are thus successively given an opportunity of entering into connection with one another for passing data. The end of each time slot is indicated by a time-slot synchronisation pulse—slot synch.—on the data bus circuit. Between two time-slot synchronisation pulses or between the first time-frame synchronisation pulse and the following time-slot synchronisation pulse, the transmission of the discrete signals of interest takes place in a digital form. In FIG. 2, a discrete signal L is shown in the first time slot, whereas a discrete signal O appears in the second time slot.

In FIG. 2, the relatively long time-frame synchronisation pulses and the relatively short time-slot synchronisation pulses are hatched to make them stand out.

Figure 3:
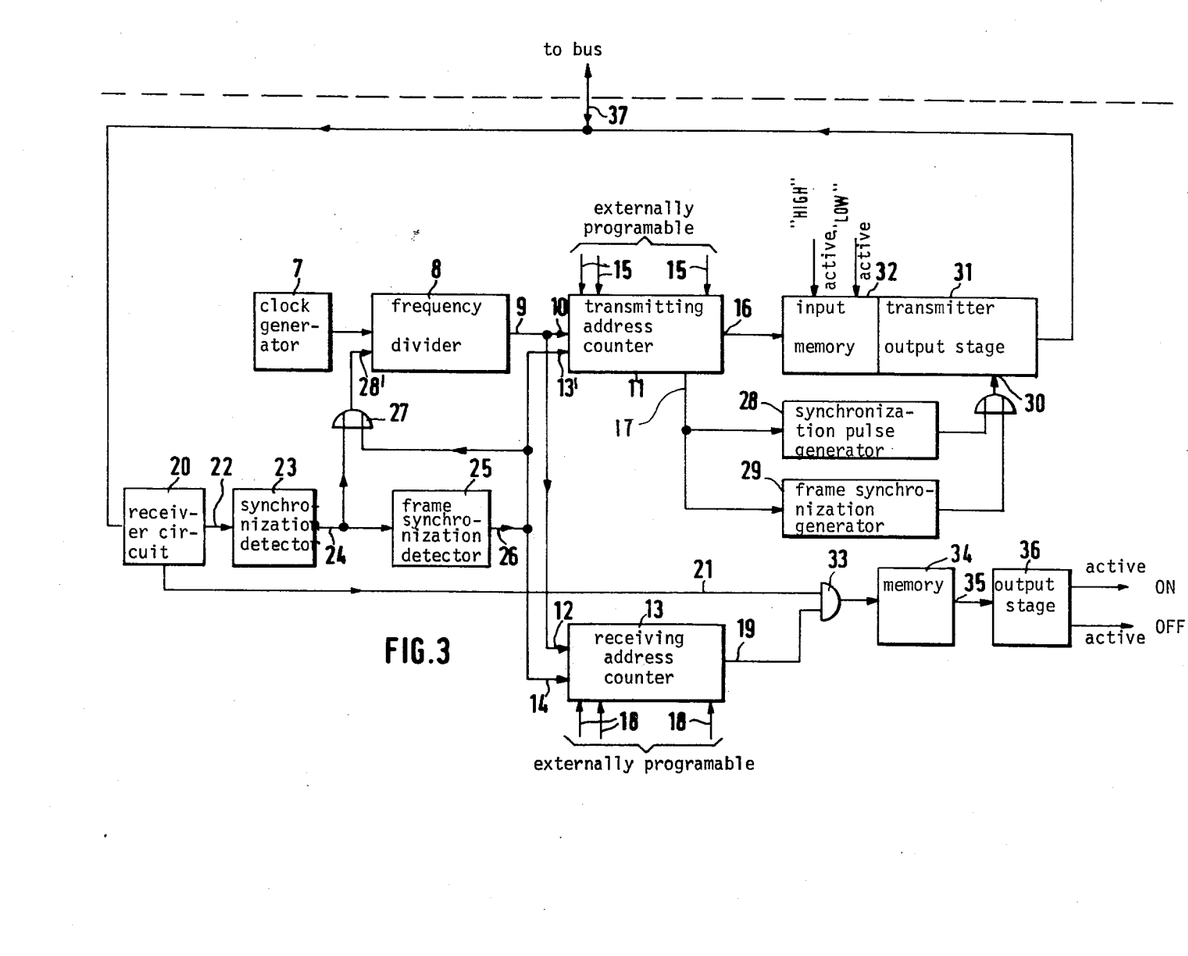
FIG. 3 shows the block diagram of a subscriber.

In FIG. 3, a subscriber having a transmitter part and a receiver part is shown. The subscriber comprises a clock generator 7 which feeds pulses to a frequency divider 8. The clock generator and the frequency divider form a clock transmitting device which delivers stepped-down clock pulses at its output 9. The output 9 is connected to one counter input 10 of a transmitting-address counter 11 and to one counter input 12 of a receiving-address counter 13. One resetting input of the transmitting-address counter and one resetting input of the receiving-address counter are marked 13 and 14 respectively. The transmitting-address counter is externally programmable by pins 15 in such a manner that, on reaching a programmed number when the transmitting-address counter counts up, a signal appears on a first control output 16. A signal appears on a second control output 17 when the transmitting-address counter is reset to zero, and also at the end of each time slot, compare FIG. 2.

The receiving-address counter 13 is externally programmable by pins 18 in a manner similar to the transmitting-address counter 11. The receiving-address counter here has only one first output 19.

The data input of the subscriber, fed by the data bus circuit, starts at a receiver circuit arrangement 20 in which the synchronisation pulses and discrete signals are obtained by separating them from a direct voltage fraction present on the data bus circuit.

A receiver line 21 on which the discrete signals to be utilised appear, and a line 22 from which the synchronisation pulses are taken, start from the receiver circuit arrangement. For this purpose, the line 22 is connected to a detector 23 for the synchronisation pulses. A line leads from the output 24 of the detector 23 to a detector 25 for the recognition of the time-frame synchronisation pulses, and this output is marked 26. From the output 26, lines lead to the resetting inputs 13' and 14 and, moreover, a line leads to an input of a logic element 27, the second input of which is connected to the output 24 of the detector 23. The output of the logic element is connected to a control input 28' of the frequency divider 8 in such a way that, when time-slot synchronisation pulses or time-frame synchronisation pulses appear, the emission of clock pulses at the output 9 of the frequency divider 8 is interrupted.

In this way it is possible to synchronise the clock generator 7, 8 with synchronisation pulses on the data bus circuit so that the clock generator can operate with relatively low accuracy and can thus be constructed relatively inexpensively without quartz.

To emit the synchronisation pulses, the second control output 17 of the transmitting-address counter is connected via a circuit arrangement 28 for the generation of time-slot synchronisation pulses and a circuit arrangement 29 for the generation of time-frame synchronisation pulses to a control input 30 of a transmitter output stage 31.

The transmitter output stage 31 is also connected via an input memory 32 to a data source, which is not shown, for discrete signals.

The receiver line 21 leads via an AND-element 33, to the input of which the receiver line and the first control output 19 are connected, to a memory 34 where the discrete signals transmitted by the data bus circuit can be stored. The memory output 35 is connected via an output stage 36 to a data sink for the discrete signals.

The receiver part of the subscriber thus essentially consists of the receiver circuit arrangement 20, the detectors 23 and 25, the receiving-address counter 13 and the memory 34 with the output stage 36. The transmitter part of the subscriber essentially comprises the transmitting-address counter 11 with the circuit arrangements 28, 29 for the generation of time-slot synchronisation pulses and the generation of time-frame synchronisation pulses, as well as the transmitter output stage 31 which is controlled by the circuit arrangements 28 and 29 and an input memory 32.

On a data bus circuit 1 in FIG. 1, at least two and up to 256 subscribers or a maximum of 512 subscribers, in which signal processing takes place in a single MOS chip, are thus provided in accordance with FIG. 3.

The transmitting address of the function emitted (source address) is determined by a defined time slot within a fixed time frame between two time-frame synchronisation pulses (FIG. 2). In its time slot, each subscriber here transmits one bit of information every 100 ms. The particular time slots are fixed by programming by means of the pins 15 on the transmitting-address counter. When the transmitting-address counter reaches the given time slot, the transmission of the discrete information stored in the input memory 32 through the transmitter output stage 31 is initiated by its control output 16.

In addition, the transmitter output stage 31 transmits, as a function of the circuit arrangement 28, a time-slot synchronisation pulse at the end of the time slot and, initiated by the circuit arrangement 29, it transmits a time-frame synchronisation pulse at the end of the time frame. The time-frame synchronisation pulses are transmitted simultaneously by all the subscribers, in each case after a pass has ended. The synchronisation pulses recognised by the detector 25 initiate the resetting of the transmitting-address counter and of the receiving-address counter and prevent counting-up in these counters until the end of the last time-frame synchronisation pulse. To this extent, all the counters of the arrangement for time-division multiplex data transmission are operated synchronously. To be able to count up synchronously in all counters even if the clock generators 7, 8 have a relatively low accuracy, the time-slot synchronisation pulse is used, which likewise is transmitted by all the subscribers simultaneously, and specifically in each time slot. Since all the subscribers are ready to receive at any time via the receiver circuit 20 and the detector 23, a synchronisation of the counters is carried out by the logic element 27 even within the time frame.

To enable each subscriber to receive the information intended for it by means of its receiver part, a defined receiving address can also be programmed, specifically via the pins 18.

Figure 4:
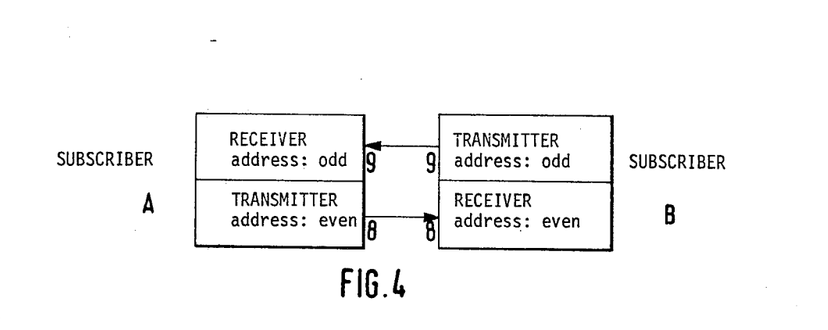
FIG. 4 shows two subscribers with a fixed allocation of the transmitting address and receiving address.
Figure 5:
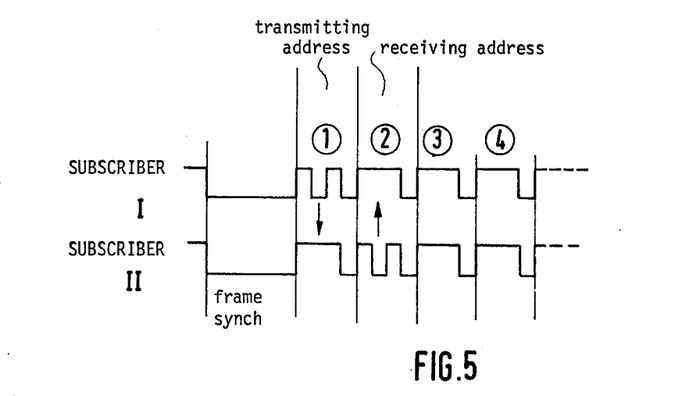
FIG. 5 shows the pulse diagram of the two subscribers according to FIG. 4.

The total number of pins to be brought out of the counters for programming can be reduced by a fixed allocation of the transmitting addresses and receiving addresses in such a way that the two are always adjacent and that the allocation of the transmitting address to even numbers and the allocation of the receiving address to odd numbers or vice versa is effected by an additional bit. In this case, the number of necessary pins can be reduced to 9.—A connection made in this way between two subscribers is shown in FIGS. 4 and 5. In the present case, the transmitter part of the subscriber A transmits in the even time slot 8, while the receiver part of the subscriber B switches the receiver line through in the same time slot. Subsequently thereto, the transmitter part of the subscriber B transmits in the adjacent odd time slot 9, while the receiver part of the subscriber A has switched its receiver line through.—Corresponding time pulse diagrams for two subscribers I and II are shown in FIG. 5. The starting point here is that the subscriber I has the source address 1 and the receiving address 2, while the source address 2 and the receiving address 1 are allocated to the subscriber II. This allocation of the transmitting address and receiving address is advantageous above all whenever the information transmitted is to be acknowledged, which, for example, is very frequently the case in aircraft.

Figure 6:
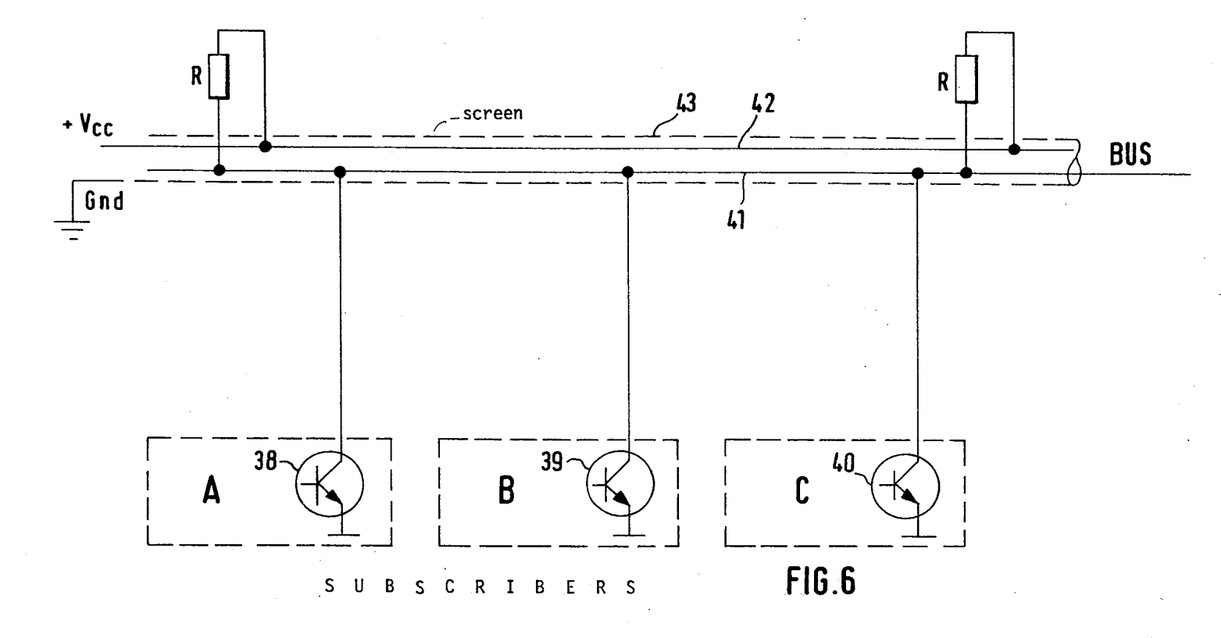
FIG. 6 shows the output stages of the transmitter part of three subscribers.

FIG. 6 shows the output stages of the transmitter part of three subscribers, which stages are designed as an open collector circuit with the transistors 38, 39 and 40. The collectors of these transistors are connected to a core 41 of the data bus circuit. A second core 42 of the data bus circuit, connected to a source of operating voltage, is coupled to the first core via two resistors R. The two cores are located within screening 43. The open collector circuit has the result that, during the substantially simultaneous emission of the synchronisation pulses, during which all the transistors are switched through, the subscriber which switches off last in time determines the point in time at which the signal level on the core 41 again assumes the level of an H signal. This determines the point in time of releasing the counters in the subscribers. Furthermore, logic operations which are explained by reference to FIG. 10 can be carried out using this circuit of transistors.

Figure 7:
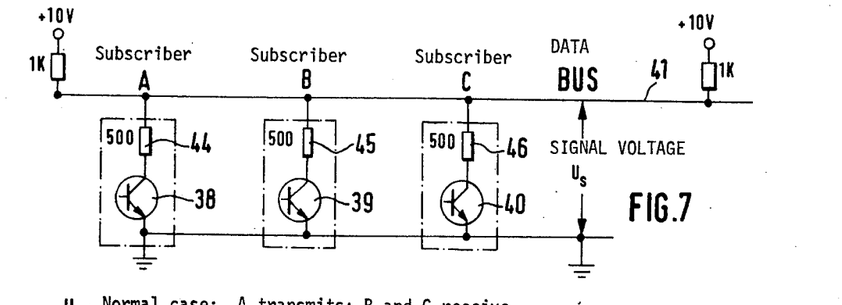
FIG. 7 shows a modification of the output stages according to FIG. 6.
Figure 8A:
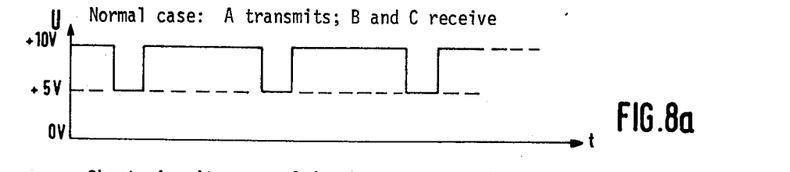
FIGS. 8a, 8b and 8c show three signal levels on the data bus circuit in different cases of short-circuit in the output stages in FIG. 7.
Figure 8B:
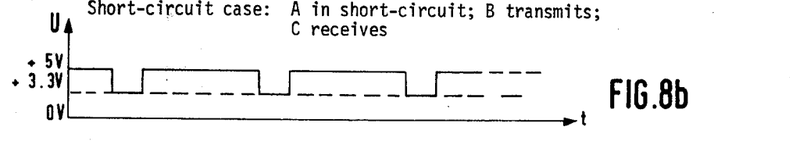
Figure 8C:
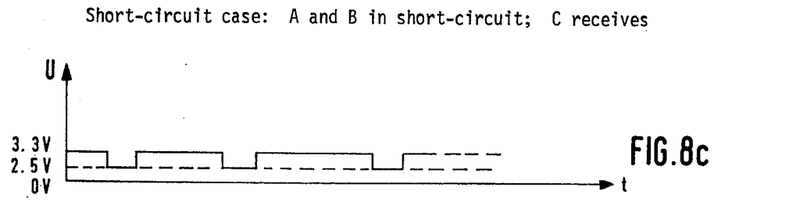

According to FIG. 7, the transmitter parts with the transistors 38, 39 and 40 are each connected to the core 41 via one resistor 44, 45 and 46. This results in the signal levels on the core 41, which are shown in FIGS. 8a–c. The signal level according to FIG. 8a here applies to the normal case where subscriber A is transmitting and subscribers B and C are receiving. In the case of short-circuit according to FIG. 8b, A is in short-circuit, while B is transmitting and C is receiving. In the case of short-circuit according to FIG. 8c, A and B are in short-circuit and C is receiving. Even in the lastmentioned case, perfect reception is still possible.

Figure 9:
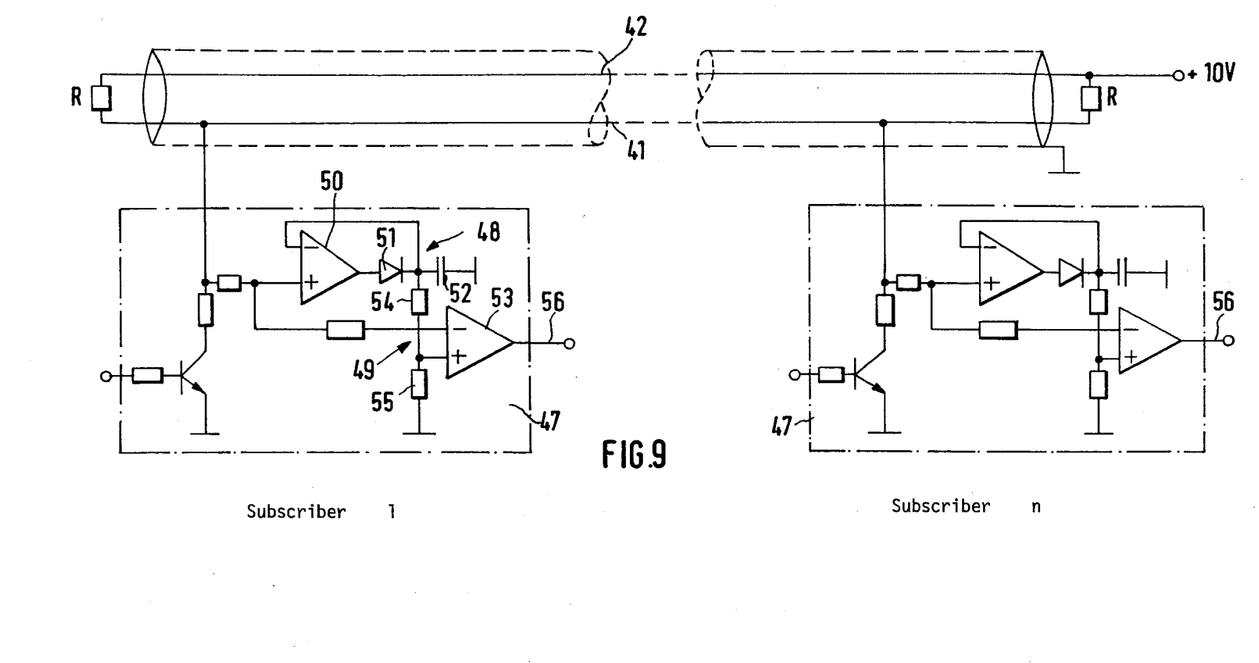
FIG. 9 shows the receiver circuit arrangement of two subscribers.

In FIG. 9, identical receiver circuit arrangements of two subscribers are marked 47. This receiver circuit arrangement essentially comprises a peak-responding rectifier 48 and a comparator 49. The peak-responding rectifier is formed by a rectifier 51 which is connected via an amplifier 50 to the core 41 and which acts on a capacitor 52. The capacitor is connected to one input of a differential amplifier 53, specifically via a voltage divider 54, 55, while a second input of the differential amplifier 53 is likewise connected to the core 41. A reference signal for the comparator is formed from the voltage of the peak-responding rectifier by means of the voltage divider so that signals of different level, on which, in addition, different direct voltages can be superimposed in the core 41, are reliably evaluated by the comparator 53. The data signals are here applied to the output 56 of the differential amplifier 53.

Figures 10, 11:
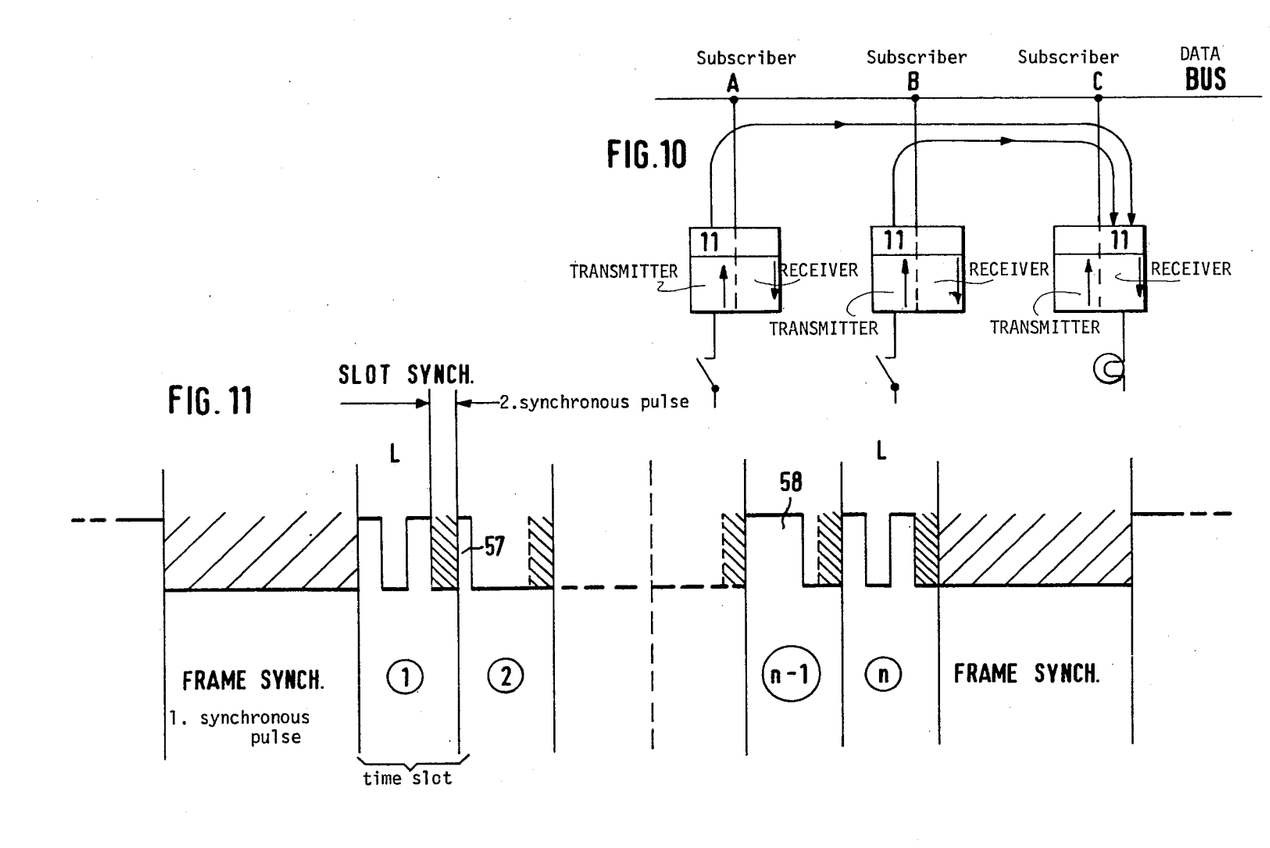
FIG. 10 shows three subscribers coupled in the manner of an OR-operation on one data bus circuit and FIG. 11 shows a pulse diagram on the data bus circuit, when an analogue value is transmitted.

The open collector circuit described also makes it possible to realise OR-operations without difficulty. Three subscribers A, B and C linked in this manner are shown in FIG. 10. The transmitting addresses of the subscribers A and B and the receiving address of the subscriber C are here identical. This means that the subscribers A and B transmit in the same time slot in which the subscriber C can receive both the discrete signals emitted. Thus, an OR-operation is established.

The transmission of analogue values is effected by means of pulses 57, the duration of which is modulated as a function of the analogue value and which are emitted or received in the same way as the other pulses in the individual time slot. In order to eliminate the distortion of the pulse edge from the evaluation, which distortion arises during the transmission and can lead to errors in evaluation, a reference pulse is transmitted in one of the following or preceding time slots and, after the transmission, a ratio is formed from the reference pulse 58 and the pulse 57, as a result of which the distortion of the pulse edge does not enter into the actual pulse evaluation. In the example selected, the duration of the reference pulse 58 represents the value complementary to the pulse 57 transmitting the analogue value.

I claim:

1. In an arrangement for time-division multiplex data transmission having a data bus system which comprises a data bus circuit, several subscribers which are connected to the data bus circuit and have a transmitter part and a receiver part and communicate with one another by data transmission in a predetermined sequence in a given combination, and at least one clock generator, in which the sequence of all the given combinations of the subscribers runs through during a time frame and a time slot within the time frame is available for connecting each combination, the improvement wherein each subscriber includes at least one programmable counter means for emitting a control signal when a programmed number has been reached and for resetting itself to zero when a given counting capacity which is the same for all said counter means has been reached, said at least one programmable counter means has a counter input connected to the clock generator and has a first control output, switching means, connected to said first control output, for forming a data-transmitting connection between the data bus circuit and a data source or data sink respectively of said each subscriber, each subscriber has the at least one clock generator, and means for enabling said at least one programmable counter means of said each subscriber to be reset synchronously with said at least one programmable counter means of the other of said subscribers and not to be subjected at said output input to clock pulses generated by the at least one clock generator until the at least one programmable counter means of a slowest of said subscribers has been reset, which determines the end of the time frame, whereby said at least one programmable counter means of all said subscribers are synchronized with one another.

2. Arrangement for time-division multiplex data transmission according to claim 1, wherein each of said at least one programmable counter means has a resetting input adapted for setting the latter to zero and one of said at least one programmable counter means of said each subscriber has a second control output, said switching means includes a transmitter output stage, another switching means is connected to the data bus circuit via said transmitter output stage and connected at each of said subscribers respectively to said second control output of said one of said at least one programmable counter means for operatively generating a time-frame synchronisation pulse upon resetting the latter to zero, and a detector means for detecting the time-frame synchronization pulses, a clock-transfer unit is connected to said clock-generator and leads to said counter input of said at least one programmable counter means, the data bus circuit is operatively connected to said resetting input of said at least one programmable counter means via said detector means for detecting the time-frame synchronisation pulses and to said clock-transfer unit leading to said counter input of the at least one programmable counter means.

3. Arrangement for time-division multiplex data transmission according to claims 1 or 2, wherein said at least one clock generator of each said subscribers respectively is synchronisable with said clock generators of the other of said subscribers such that the slowest subscriber determines the end of each time slot.

4. Arrangment for time-division multiplex data transmission according to claim 1, wherein said at least one programmable counter means has a resetting input adapted for setting the latter to zero and one of said at least one programmable counter means has a second control output, said switching means includes a transmitter output stage, another switching means is connected to the data bus circuit via said transmitter output stage and connected at each of said subscribers respectively to the second control output of said one of said at least one programmable counter means for emitting a time-slot synchronisation pulse, an OR-gate connected to said transmitter output stages of said subscribers and to the data bus circuit such that the slowest subscriber determines an end of the time slot.

5. Arrangement for time-division multiplex data transmission according to claim 1, wherein the transmitter part of each said subscriber is a transmitting-address counter with one counter input constituting one of said at least one programmable counter means and the receiver part of each said subscriber is a receiving-address counter with one counter input constituting another of said at least one programmable counter means, said one counter inputs of said counters are connected to said clock generator, and means for programming said counters independently of each other.

6. Arrangement for time-division multiplex data transmission according to claim 5, wherein said programming means for allocating a transmitting address and an immediately adjacent receiving address are only for programming the counters for one number, and the subscriber also comprises switch means for allocating the transmitting address to a first set of numbers and allocating the receiving address to a second set of numbers, one of said sets of numbers is even and the other of said sets is odd.

7. Arrangement for time-division multiplex data transmission, according to claim 1, further comprising a voltage source, of at least one resistor connected to said voltage source, the transmitter part includes a transmitter output stage constituting a portion of said switching means and constitutes an open collector circuit and the data bus circuit is joined to said transmitter output stages of said subscribers and is connected via said at least one resistor to said voltage source such that all said transmitter output stages form an OR-gate.

8. Arrangement for time-division multiplex data transmission according to claim 7, wherein said at least one resistor is a plurality of resistors, the transmitter output stages of said subscribers are each connected via one of said plurality of resistors respectively to the data bus circuit.

9. Arrangement for time-division multiplex data transmission according to claim 7, wherein the data bus circuit provided is a two-core screened line, one core of the line is directly connected to said voltage source and connected via a plurality of said resistors in parallel to another core of the line, the transmitter output stages of each of said subscribers are connected to said another core.

10. Arrangement for time-division multiplex data transmission according to claim 1, further comprising means for providing analogue pulses having a duration which depends on an analogue value transmittable in the time slots.

11. Arrangement for time-division multiplex data transmission according to claim 10, further comprising means for transmitting a reference pulse at intervals from the analogue pulses, and means comprising a stage for forming from both said reference pulse and said analogue pulses their ratio.

12. Arrangement for time-division multiplex data transmission according to claim 11, wherein said reference pulse is a pulse having a duration which is the value complementary to the duration of the analogue pulses.

13. Arrangement for time-division multiplex data transmission according to claim 11, wherein said reference pulse is a pulse having a duration which is 100% of the maximum possible duration of the analogue pulses.

14. In an arrangement for time-division multiplex data transmission having a data bus system which comprises a data bus circuit, several subscribers which are connected to the data bus circuit and have a transmitter part and a receiver part and communicate with one another by data transmission in a predetermined sequence in a given combination, and at least one clock generator, comprising the improvement of a receiver circuit arrangement of each subscriber comprises, an electronic comparator having a differential amplifier and a peak-responding rectifier said differential amplifier of the electronic comparator having a first input and a second input, a voltage divider is connected to said peak-responding rectifier and to said second input, said first input of said differential amplifier and one input of said peak-responding rectifier are connected to the data bus circuit and said second input of the differential amplifier of the electronic comparator is connected to said peak-responding rectifier via said voltage divider.

* * * * *